May 15, 1951 C. E. KERR 2,552,634
VALVE CONTROL MECHANISM
Filed Feb. 25, 1946 3 Sheets-Sheet 1
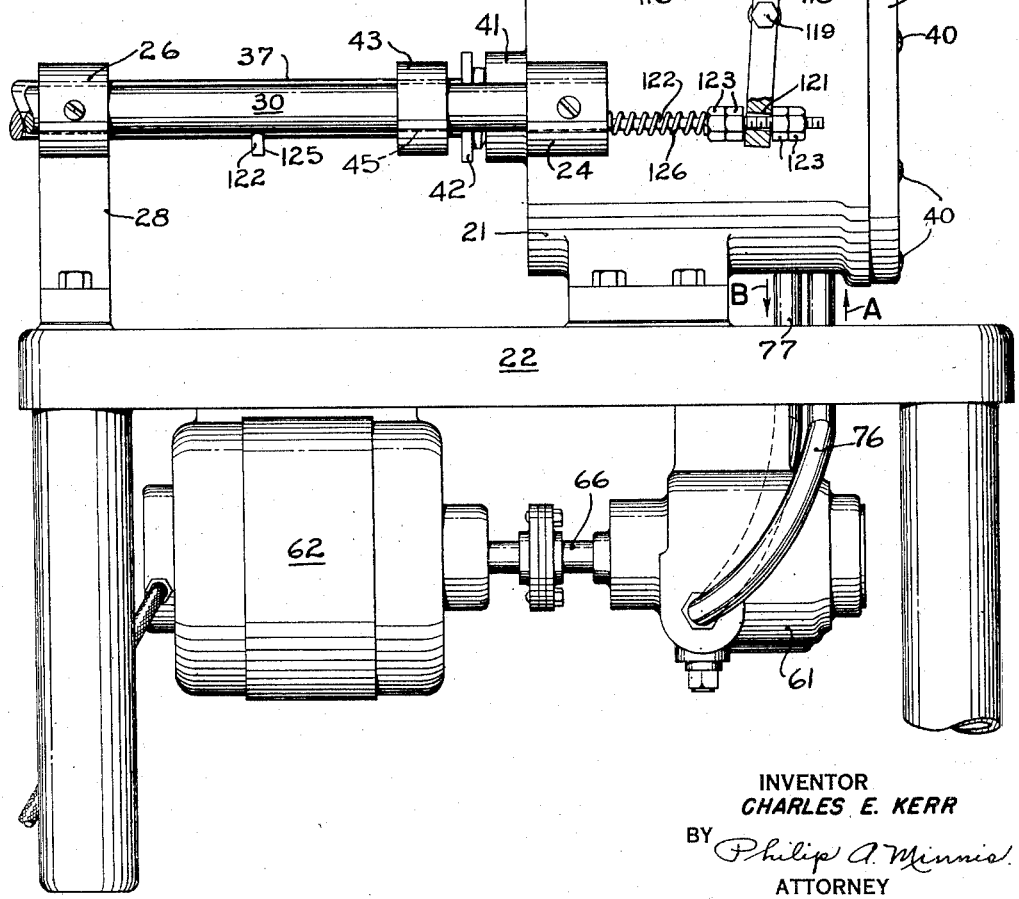
INVENTOR
*CHARLES E. KERR*
BY *Philip A. Minnis*
ATTORNEY May 15, 1951  C. E. KERR  2,552,634
VALVE CONTROL MECHANISM
Filed Feb. 25, 1946  3 Sheets-Sheet 2
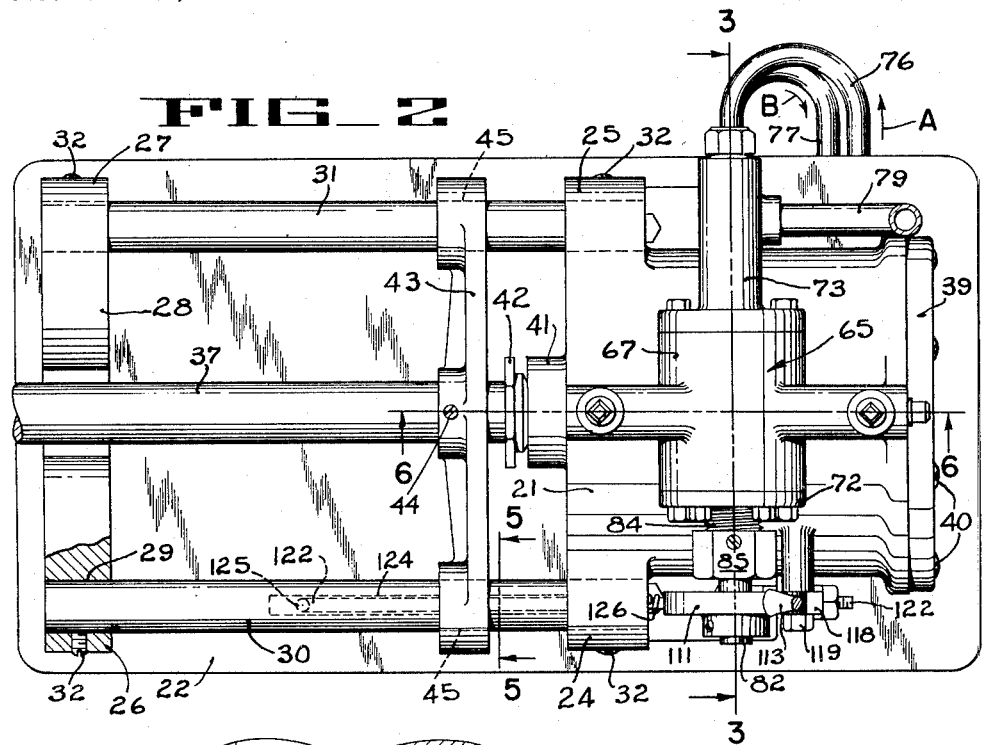
INVENTOR
CHARLES E. KERR
BY Philip A. Minnis
ATTORNEY

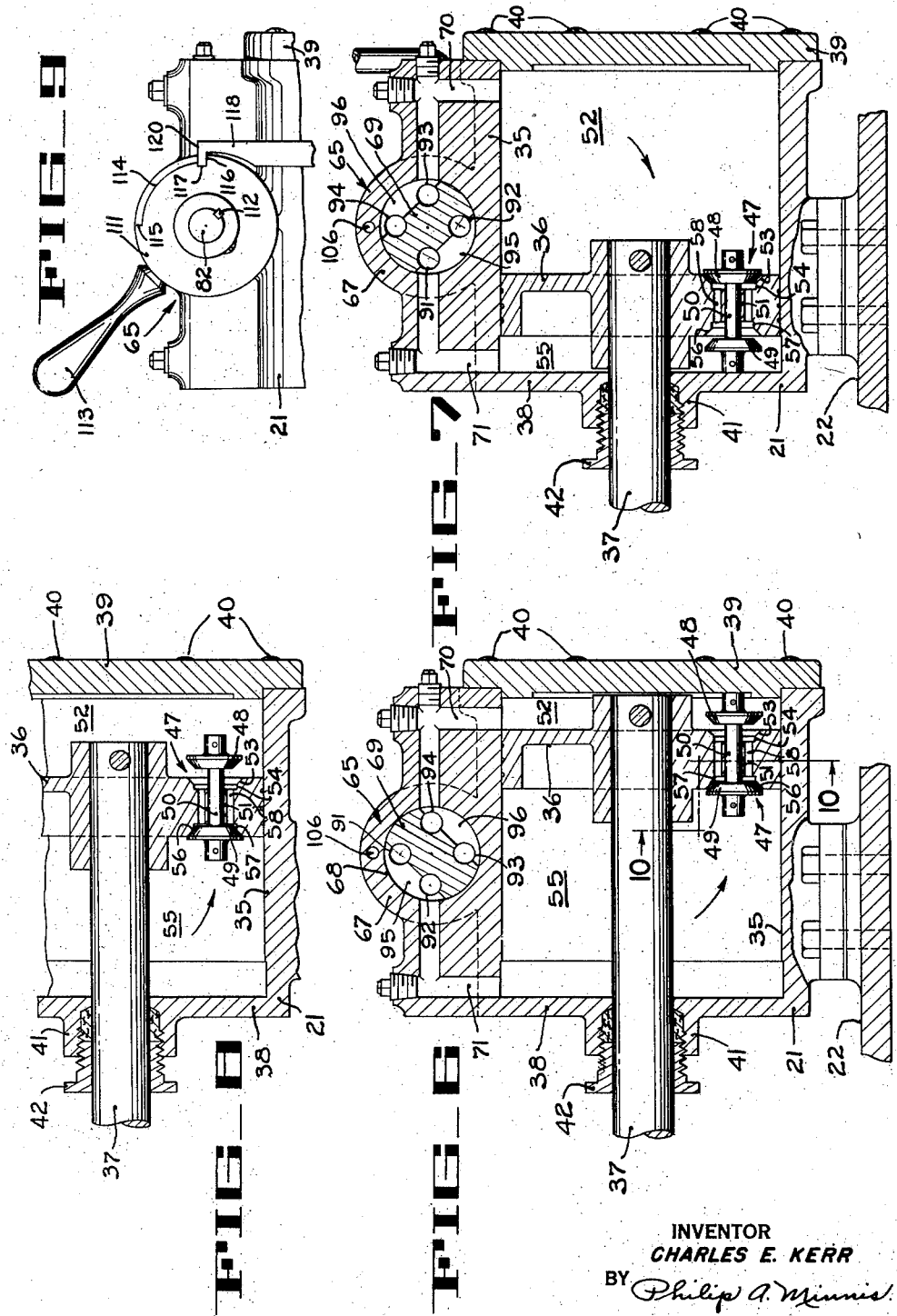

Patented May 15, 1951

2,552,634

UNITED STATES PATENT OFFICE 2,552,634

VALVE CONTROL MECHANISM

Charles E. Kerr, Hoopeston, Ill., assignor to Food Machinery and Chemical Corporation, a corporation of Delaware Application February 25, 1946, Serial No. 650,012

9 Claims. (Cl. 121—38)

This invention relates to motors and more particularly to motors of the type in which a piston is adapted to be operated by a non-compressible fluid, such as oil under pressure.

An object of the invention is to provide an operating mechanism for machines comprising a movable part against which a relatively non-compressible fluid is directed and a fluid distributing means in which the operating fluid is cyclically directed to act upon and cyclically change the direction of travel of the movable part.

Another object of the invention is to provide an operating mechanism for machines comprising a movable part against which a relatively non-compressible fluid is directed, a valve mechanism for directing fluid under pressure against the movable part, and mechanism independent of the movable part for actuating the valve mechanism to control the cycle of operation of the operating mechanism.

A further object of the invention is to provide a fluid motor in which the piston is adapted to make a forward and a reverse stroke and then remain inactive until it is desired to again operate the motor.

Another object of the invention is to provide means for controlling the movement of the piston in the cylinder of a fluid motor by which the forward movement of the piston in the cylinder is initiated by a manual setting of fluid control means and the return movement of the piston is effected automatically by means operable independently of the manual setting means.

A further object of the invention is to provide simple and effective mechanism for controlling the operation of the motor-piston by which the cycle of operation includes a single forward and a single rearward stroke of the piston.

A still further object of the invention is to provide an automatic stop for the piston of a motor operated by fluid pressure flowing continuously in a closed circuit, by which the movement of the piston is arrested at the end of each stroke without reversing the direction of flow of the operating fluid through the closed circuit.

It is also an object of the invention to provide a fluid motor of the character referred to, which is simple and compact in construction, accurate in operation, and which can be manufactured economically.

Additional objects and advantages of the invention will more readily appear from the following description of a preferred embodiment, as illustrated in the accompanying drawings, in which:

Fig. 1 is a side elevation of a fluid motor constructed according to the present invention.

Fig. 2 is a plan partly in horizontal section of the structure shown in Fig. 1.

Fig. 3 is a vertical transverse section taken along the line 3—3 of Fig. 2.

Fig. 4 is a vertical transverse section taken along the line 4—4 of Fig. 3.

Fig. 5 is a vertical transverse section taken along the line 5—5 of Fig. 2.

Fig. 6 is a vertical longitudinal section taken along the line 6—6 of Fig. 2, showing the piston at one end of the fluid motor cylinder.

Fig. 7 is a section similar to Fig. 6 showing the piston at the other end of the cylinder.

Fig. 8 is a section of a portion of the motor cylinder showing the piston in an intermediate position.

Fig. 9 is a fragmentary elevation of a portion of the fluid motor cylinder showing the operating handle of the control valve device in another position from the position shown in Fig. 1.

Fig. 10 is a vertical section taken on the line 10—10 of Fig. 6.

The fluid motor of the present invention is particularly useful as a power unit for tenderness testing machines such as the machine shown in my copending application Serial No. 650,013 filed February 25, 1946, now Patent No. 2,473,063. Its usefulness for other purposes will be apparent from the following detailed description of the construction and operation thereof.

The fluid motor comprises a cylinder block or body 21 mounted on a suitable base 22. The cylinder block 21 has a pair of diametrically disposed ears 24, 25 formed on the exterior thereof in alignment with a pair of ears 26, 27, respectively, formed on a standard 28, also mounted on the base 22. All of the ears are bored, as indicated at 29, Fig. 2, to provide aligned pairs of openings. The openings of the ears 24, 26 receive the ends of a guide rod 30, and the openings of the ears 25, 27 receive the ends of a guide rod 31. The guide rods 30, 31 are held fixedly mounted in the ears, respectively, by set screws 32.

As shown in Figs. 6 and 7, the cylinder block 21 is formed with a cylinder 35 for a piston 36, to which is connected one end of a piston rod 37. One end of the cylinder 35 is closed by a wall 38 formed integral with the cylinder block 21, and the other end of said cylinder is closed by a removable cover 39 which is secured to the end of the cylinder block 21, by securing elements 40. The end wall 38 of the cylinder is formed with a boss 41 which extends outwardly therefrom. The boss 41 is formed with an opening through which the piston rod 37 extends, the joint therebetween being sealed by means of a packing gland having a packing ring 42 threadedly mounted on the outer end portion of the boss 41 in well known manner.

Arranged transversely of the apparatus, and mounted on the guide rods 30, 31, and piston rod 37, is a guide member 43 which is fixed to the piston rod by set screw 44, Fig. 2, for reciprocating movements therewith in directions lengthwise of the guide rods 30, 31. Each end portion of the guide member 43 is also provided with bushed openings 45 through which the guide rods 30, 31 extend so that the guide member is freely slidable on the supports provided by said guide rods.

The movement of the piston 36 is automatically stopped at the end of each stroke of the piston, by a poppet valve device, generally indicated at 47 in Figs. 6, 7 and 8.

The valve device 47 comprises two tapered poppets 48, 49, fixedly mounted on the opposite ends of a stem 50, slidably mounted in a bearing 51 extending through the body of the piston 36. The poppet 48 is disposed in chamber 52 at one side of the piston 36 and is arranged to engage a valve seat 53 formed in the outer portion of a recess 54 counterbored in the side of the piston facing chamber 52. The poppet 49 is disposed in chamber 55 at the side of the piston 36 opposite to the side in which the poppet 48 is located, said poppet 49 being arranged to engage a valve seat 56 formed in the outer portion of a recess 57 counterbored in the side of the piston facing chamber 55.

The valve stem 50 has such a length that when poppet 48 is seated against valve seat 53, poppet 49 will be unseated from valve seat 56, and when poppet 49 is seated against valve seat 56, poppet 48 will be unseated from valve seat 53.

The poppets 48, 49 are arranged to control communication through the piston 36 from chamber 52 to chamber 55, and vice versa, provided by a plurality of passageways 58 which are formed through the body of said piston, Fig. 10. The passageways 58 are radially disposed with respect to the longitudinal center line of the valve stem 50, said passageways being spaced apart equal distances from each other and terminating at each end within the confines of the recesses 54, and 57, respectively, so that when either poppet 48, 49 is seated, communication through the piston 36 will be cut-off. The manner in which the poppet valve device 47 functions to automatically control the movements of the piston 36 will be hereinafter described.

In the normal inactive position of the parts the piston 36 is disposed at the right hand end of cylinder 35 (Fig. 6), being spaced a slight distance from the inner surface of cover 39. When the piston 36 is disposed in the above manner with respect to the end of the cylinder 35, one end of the stem 50 of the poppet valve device 47 abuts the inner surface of the cover 39, so that both poppets 48, 49, are unseated from the valve seats 53, 56, respectively. Consequently, operating fluid is permitted to flow through the piston 36.

In the present instance the operating fluid is oil, and the oil is continuously circulated through a closed circuit to be hereinafter described, by a pump 61, constantly driven by an electric motor 62 (Fig. 1). The closed circuit of the operating fluid includes the cylinder 35, and the flow of operating fluid through said cylinder is under the control of a valve device 65 mounted on top of the cylinder block 21. For convenience, the pump 61 and the electric motor 62 may be suspended from the underside of the base 22, the motor 62 being connected to the pump in driving relation by a shaft 66.

The control valve device 65 comprises a housing 67 formed integrally with the cylinder block 21, said housing having a cylindrical chamber 68 therein for a valve element 69. As shown in Figs. 3, 6, and 7 the longitudinal center line of the valve chamber 68 is arranged at right angles with respect to the longitudinal center line of the cylinder 35.

Leading from one side of the valve chamber 68 and connected to the cylinder 35 at the outer end of the chamber 52, is a passageway 70, and leading from the opposite side of said valve chamber and connected to the cylinder 35 at the outer end of chamber 55, is a passageway 71, Figs. 6 and 7. The passageways 70, 71 provide fluid distribution conduits connected to the opposite sides of the valve chamber 68 in spaced relation to the ends of said chamber, and the valve element 69 is arranged to control the flow of operating fluid through the passageways 70, 71 in the manner to be hereinafter more fully described.

As shown in Figs. 2 and 3, mounted on one end of the control valve housing 67 is a cap 72, and mounted on the opposite end of said housing and forming an extension thereof is a casing 73 for a relief valve device. The casing 73 has a pair of conduits 74, 75 formed lengthwise thereof, the inner ends of said conduits terminating at an end of the valve chamber 68. Leading from the pressure side of the oil circulating pump 61 and connected to the outer end of the conduit 74, is a conduit or feed line 76. Connecting the intake side of the pump 61 and the outer end of the conduit 75, is a conduit or return line 77. The arrows A, B, Figs. 1 and 2, indicate the direction of fluid flow through the conduits 76, 77, respectively.

Oil for maintaining the parts of the fluid motor full at all times is obtained from a tank 78, Fig. 1, having its outlet connected to the return conduit 75, by pipe 79, as shown in Fig. 4. The tank 78 has a cover 80 which is removable when it is desired to replenish the supply of oil in said tank. Since the tank is located above the control valve device 65, oil will flow by gravity therefrom into conduit 75 so that the cylinder 35, control valve device 65, pump 61, and the conduits connecting the same will at all times be full of operating fluid.

The valve element 69 of the flow control valve device 65 comprises a rotatable valve or gate having a length less than the length of the valve chamber 68, Fig. 3. One end wall of the valve 69 is arranged to abut the inner face of the relief valve casing 73, and the other end wall of the valve is spaced from the inner face of the cap 72 so that a cavity 81 is provided at one end of the valve chamber 68. A valve stem 82 extends from the end of the valve 69 facing the cavity. The valve stem 82 passes through an opening 83 formed in the cap 72 and boss 84 projecting outwardly from the cap, and terminates at a suitable distance beyond the outer end of said boss. The joint between the valve stem 82 and the cap 72 is sealed by means of a packing gland having a packing nut 85 threadedly mounted on the outer end portion of the boss 84.

The gate or valve element 69 is normally retained with its inner end abutting the inner face of the relief valve casing 73 by means of a combined compression and torsion spring 86 which encircles the portion of the valve stem disposed within the cavity 81, one end of said spring being secured to the stationary cap 72 and the other end being fixed to the valve element 69 (Fig. 3).

Formed longitudinally within the body of the valve 69 in spaced relation to the longitudinal center line thereof, are passageways 91, 92, 93 and 94. These passageways or ports communicate with the conduits 74, 75, and extend only part way through the valve. As shown in Figs. 3 and 6, passageways 91, 92 terminate at a port 95 and the passageways 93, 94 terminate at 96. The ports 95, 96 are formed at right angles to the longitudinal axis of the valve 69 and are arranged to connect the passageways 91, 92, 93 and 94 with the passageways 70, 71 so that oil under pressure from the pump 61 will be supplied to chambers 52, 55 for actuating the piston 36 in the manner to be hereinafter described.

As shown in Figs. 3 and 4 within the casing 73 is a pressure relief valve device comprising a ball valve 101 backed by a spring 102, the pressure of which can be varied by adjusting the retaining plug 103. The ball 101 is normally held by spring 102 against a seat 104 to cut-off communication from conduit 74 to conduit 75, through by-pass conduit 105 in the valve device. The pressure of spring 102 is greater than the normal pressure of the oil flowing through the conduit 74 from the pump 61 toward the flow control valve device 65 and the cylinder 35.

When the pressure of the oil in the feed line 76 from the discharge side of the pump 61 increases a predetermined amount above the pressure of spring 102 against ball valve 101, the ball 101 will be unseated to establish communication through by-pass conduit 105 and from thence through the return line 75, 77 to the intake side of pump 61. In this way, whenever the resistance to the movement of the operating piston 36 increases above a predetermined amount, the continuous flow of operating fluids toward the piston chambers in cylinder 35 temporarily passes through a circuit which by-passes the flow control valve device 65 and the power or operating cylinder 35, until the obstruction to the movement of the piston 36 is removed and the fluid pressure reduces and the ball 101 is seated by spring 102 to cut-off communication through the by-pass conduit 105.

For the purpose of preventing an endwise movement of the gate or valve 69 within the valve chamber 68 due to excess pressure of the oil delivered by the conduit 74 to said valve chamber, as opposed by the pressure of the torsion spring 86 within the cavity 81 acting against the outer end of said valve, a by-pass conduit 106 (Fig. 3) is provided around the valve 69. The by-pass conduit 106 is formed in the body of the control valve device 65 and has a port 107 at one end in communication with the joint between the inner end of the fluid supply conduit or passageway 74 and the rear end of the valve 69. The outer end of the by-pass conduit 106 terminates at cavity 81. Thus the cavity 81 is filled with oil supplied through the by-pass 106 and the pressure of oil in the cavity, plus the pressure of the torsion spring 86 maintains the rear face 108 of the valve 69 against the face 109 of the relief valve casing 73 at all times.

Mounted on the outer end portion of the valve stem 82, is a disc 111 which is made rigid with said valve stem by means of a key 112, Figs. 1 and 9. Projecting radially from the periphery of the disc 111, is a handle 113, by which the valve 69 is adapted to be manually operated in the manner to be hereinafter described.

A portion of the periphery of the disc 111 is reduced radially, as indicated at 114, to provide a pair of shoulders 115, 116, the shoulder 116 being extended inwardly of the body of said disc to provide a notch 117. A locking member 118 is pivotally mounted on the cylinder block 21, as indicated at 119, Fig. 1, one end of said locking member being formed with a nose which constitutes a detent 120. When the valve 69 is in one position the detent 120 is adapted to engage notch 117 to hold the valve 69 in such position against the action of the torsion spring 86. Normally the torsion spring 86 urges the valve 69 in the direction in which the detent 120 engages the shoulder 115, as shown in Fig. 1.

The lower end portion of the locking member 118 has an opening 121 formed therein for loosely receiving a rod 122. The outer portion of the rod 122 which extends through the opening 121 is threaded to receive nuts 123 which are positioned on each side of the locking member 118. The rod 122 is slidably mounted in a slot 124 formed lengthwise in the guide rod 30 in the manner shown in Fig. 5, the inner end of rod 122 being bent downwardly to provide a finger 125 which is disposed in the path of an end of the guide member 43 (see Fig. 1).

Surrounding the rod 122 and bearing at one end against one of the nuts 123 and bearing at the other end against the end surface of ear 24 of the stationary cylinder block 21, is a coil spring 126 which is arranged to maintain the detent 120 normally in engagement with the surface of the cut out portion 114 of disc 111 so that said detent will engage shoulder 115. The nuts 123 are threadedly mounted on the rod 122 so that a loose and variable connection is provided between the locking member 118 and the rod 122.

When the fluid motor is in an operative but inactive condition, i. e., when the electric motor 62 is operating the pump 61, the parts are positioned so that the piston 36 is disposed adjacent to the right hand end of the cylinder 35 but in slightly spaced relation to the wall of cover 39, as shown in Fig. 6, and as a consequence the piston rod 37 is retracted within the cylinder 35. At the same time the handle 113 is disposed in the position shown in Fig. 1, so that the disc 111 of the flow control valve device 65 is positioned with the shoulder 115 thereof in engagement with the detent 120. The gate or rotatable valve 69 is thus disposed in the position shown in Fig. 6, whereby port 95 connects passageway 91 with passageway 71, and port 96 connects passageway 93 with passageway 70. Passageway 91 registers with the conduit or passageway 74 leading from the pressure side of the pump 61 and passageway 93 registers with the return conduit or passageway 75 to the pump. The passageways 92 and 94 are both blocked off by the face 109 of the relief valve casing 73. Oil under pressure from the pump 61 thus flows through the closed circuit including passageways 76, 74, 91, port 95, and passageway 71 to piston chamber 55, and from thence past unseated poppet valves 48, 49 through passageways or ports 58, to piston chamber 52, and from thence the oil returns to the intake side of the pump 61, through passageway 70, port 96, and passageways or conduits 93, 75 and 77.

When it is desired to operate the fluid motor, the handle 113 of the flow control valve device 65 is moved from the position shown in Fig. 1 to the position shown in Fig. 9, the detent 120 engaging the notch 117 to hold the valve in manually adjusted position. This movement of the handle is through an angle of approximately 90° and the gate or valve 69 is turned from the position shown in Fig. 6 to the position shown in Fig. 7. The passageways 91 and 93 are now both blocked off by the face 109 of the relief valve casing 73 and passageways 94 and 92 are registered with the conduits 74, 75, respectively. Oil under pressure from the pump 61 now flows to piston chamber 52 through conduits or passageways 76, 74, 94, port 96, and passageway 70, and piston chamber 55 is connected to the intake side of the pump 61 through passageway 71, port 95 and passageways 92, 75 and 77. In passing through the passageways 58 of the piston 36 at the initiation of the reversal of flow through the cylinder 35, the oil acts against poppet 49 which is not restrained and will yield under pressure, with the result the poppets 48, 49 are forced leftward of their positions shown in Fig. 6, thereby seating poppet 48 against its seat 53 and cutting off communications through the passageway 58 in the piston 36. The pressure of oil builds up in piston chamber 52 and consequently piston 36 is forced toward the left. During the movement of the piston 36 in the left hand direction oil in chamber 55 flows through passageway 71, port 95 and passageways or conduits 92, 75 and 77 toward the intake side of pump 61.

When the piston 36 is thus moved in a left hand direction it pushes the piston rod 37 outwardly or in a left hand direction with respect to the cylinder 35, and the movement of the piston 36 is automatically stopped at the end of its stroke toward the left. During the travel of the piston toward the left, poppet 48 is seated against its seat 53. When the piston 36 approaches end wall 38 of cylinder 35, the end of the valve stem 50 adjacent poppet 49 abuts the surface of said end wall in the manner shown in Fig. 7. This holds the poppet valve device 47 stationary while the piston 36 continues moving toward the end wall 38. As the result poppet 48 is unseated from its seat 53, thereby establishing communication from piston chamber 52 to piston chamber 55, through the passageways 58. As soon as communication is thus established through the piston 36 the pressure of oil in the chambers 52, 55, at the opposite sides of the piston 36 becomes equalized, with the result the piston 36 comes to rest while both poppets 48 and 49 are unseated. This action is substantially instantaneous and the piston 36 is then automatically returned to its starting position in the manner now to be described.

At the end of the movement of the piston 36 toward the left, an end of the guide member 43 engages the finger 125 on the end of the rod 122 and moves said rod and the lower end of the locking member 118 toward the left against the force of spring 126. The upper end of the locking member 118 is thereby swung in a clockwise direction so that detent 120 disengages the notch 117 whereupon disc 111 is released for movement by torsion spring 86, clockwise Fig. 9, until detent 120 engages shoulder 115 to retain valve 69 in its initial position. Oil under pressure from pump 61 is now supplied to piston chamber 55 through conduits or passages 76, 74, 91, port 95, and passageway 71. In passing through the passageways 58 of the piston 36 from chamber 55 to chamber 52 at the initiation of the reversal of flow through the cylinder 35, the oil acts against poppet 48, which is not restrained and will yield under pressure, with the result the poppets 48, 49 are forced toward the right, or from the position shown in Fig. 7 to the position shown in Fig. 8, thereby seating poppet 49 against its seat 56 and cutting off communication through the passageways 58 in the piston 36. The pressure of oil builds up in piston chamber 55 and consequently piston 36 is forced toward the right, the oil in chamber 52 returning to the intake side of the pump 61, through passageway 70, port 96, and passageways or conduits 93, 75 and 77.

The movement of the piston 36 toward the right, is automatically stopped when the right hand end of the valve stem 50 strikes the inner surface of the cover 39, Fig. 6. The poppet valve device 47 is held stationary while the piston 36 continues moving toward the cover 39 until the poppet 49 is unseated from its seat 56, thereby establishing communication from chamber 55 through passageways 58 to chamber 52, so that the pressure of oil in the chambers 52, 55, at the opposite sides of the piston 35 becomes equalized, and the piston 36 comes to rest. This completes a cycle of operation of the fluid motor.

Having now described my invention, and in what manner the same may be used, what I claim as new and desire to protect by Letters Patent is:

1. In combination with an operable member alternately movable from retracted to extended positions, a fluid motor connected to said member for actuating the same, a source of fluid under pressure, supply and exhaust conduits, means for controlling the flow of fluid through said conduits to said fluid motor, including a rotatable valve, manually actuated means for operating said valve to a position to admit fluid to said fluid motor to move the operable member to its extended position, latch means for said valve normally biased to a latching position movable by said operable member to an unlatching position when the operable member attains its extended position, and means independent of said manually operated means for operating said valve when said valve is unlatched to position the valve to admit fluid to said fluid motor to move the operable member to its retracted position.

2. In combination with an operable member alternately movable from retracted to extended positions, a fluid pressure motor connected to said operable member for actuating the same, a control device for supplying fluid pressure to the motor, a handle for manually operating said control device to effect the flow of the pressure to the motor to move the operable member to its extended position, a torsion spring connected to said control device and put under tension when the control device is operated by said handle, a locking mechanism for holding the control device in position after it has been operated by said handle, and means actuated when the operable member attains its extended position for releasing the locking mechanism, whereby the control device is positioned by said torsion spring to effect the flow of the pressure to the motor to move the operable member to its retracted position.

3. A fluid pressure motor comprising a cylinder, a piston in the cylinder, a piston rod connected to said piston, inlet and exhaust passages opening into opposite ends of said cylinder, a source of fluid under pressure, a valve for controlling the flow of operating fluid to said inlet and exhaust passages, an annular disc on the stem of said valve having a cut-out portion in its periphery to provide a shoulder at one end of said cut-out portion and a notch at the other end of the cut-out portion, a pivoted spring-held detent arranged to engage said shoulder to hold the valve normally in a predetermined position in which the piston is adjacent one end of the cylinder and the piston rod is retracted within said cylinder, a handle for operating said valve manually to position the valve to effect the flow of operating fluid to the end of said cylinder in which the piston is disposed to move the piston rod outwardly of said cylinder, said detent being arranged to engage said notch to retain the valve in locked position after it has been manually positioned, a torsion spring connected to said valve and put under tension when the valve is manually operated by said handle, and means operable when the piston rod has been moved outwardly of the cylinder a predetermined distance for releasing said detent from the notch whereby the torsion spring positions the valve to effect the flow of operating fluid to the other end of said cylinder to move the piston rod inwardly of said cylinder, said detent being arranged to engage said shoulder to retain the valve in the latter position.

4. A fluid pressure motor comprising a cylinder, a piston working therein, a housing on said cylinder having a chamber formed therein, a fluid supply conduit and an exhaust conduit opening into one end of said chamber, inlet and exhaust passageways connecting the opposite sides of said chamber with the opposite ends of said cylinder respectively, a valve rotatably mounted within said chamber and having an inner end in face to face engagement with the inner end of said chamber to which said fluid supply conduit and said exhaust conduit are connected, ports formed in said valve for connecting said conduits with said passageways to supply fluid to effect rectilinear movements of said piston within said cylinder, the length of the body of said valve being less than the length of said valve chamber so as to provide a cavity within said housing between the outer end of said valve and the outer end of said valve chamber, a valve stem extending through an opening in the wall of said housing at the outer end of said valve chamber, a valve return spring coiled coaxially about said valve stem and arranged to be put under tension when the valve is rotated, means mounted on the valve stem exterior of said housing for rotating the valve through a predetermined angle to connect the fluid supply to one end of the cylinder to effect movement of the piston in one direction in the cylinder, means for locking the valve in position when it has been rotated to the predetermined position, and means actuated by movement of the piston through a predetermined distance for unlocking the valve, whereby said valve is returned by said spring to its first position to effect movement of the piston in the opposite direction in said cylinder.

5. A fluid pressure motor comprising a cylinder, a piston working therein, a housing having a chamber formed therein, a fluid supply conduit and an exhaust conduit opening into one end of said chamber, inlet and exhaust passageways connecting the opposite sides of said chamber with the opposite ends of said cylinder respectively, a valve rotatably mounted within said chamber and having an inner end in face to face engagement with the inner end of said chamber to which said fluid supply conduit and said exhaust conduit are connected, ports formed in said valve for connecting said conduits with said passageways to supply fluid to effect rectilinear movements of said piston within said cylinder, the length of the body of said valve being less than the length of said valve chamber so as to provide a cavity within said housing between the outer end of said valve and the outer end of said valve chamber, a valve stem extending through an opening in the wall of said housing at the outer end of said valve chamber, a valve return spring coiled coaxially about said valve stem and arranged to be put under tension when the valve is rotated, means for rotating the valve to connect the fluid supply to one end of the cylinder to effect movement of the piston in one direction in the cylinder, means for locking the valve in position when it has been rotated, means actuated by movement of the piston through a predetermined distance for unlocking the valve, whereby said valve is returned by said spring to its first position to effect movement of the piston in the opposite direction in said cylinder, and a conduit formed in the housing for connecting said cavity with the fluid supply so that the cavity is maintained full of fluid to retain the valve in face to face engagement with the inner end of said chamber.

6. A fluid flow control valve device, comprising a housing having a chamber formed therein, a fluid supply conduit and an exhaust conduit opening into one end of said chamber, fluid distribution passageways connected to the opposite sides of said chamber in spaced relation to the ends thereof, a valve rotatably mounted within said chamber and having an inner end in face to face engagement with the inner end of said chamber to which said fluid supply conduit and said exhaust conduit are connected, ports formed in said valve for selectively connecting said conduits with said passageways, the length of the body of said valve being less than the length of said valve chamber so as to provide a cavity within said housing between the outer end of said valve and the outer end of said valve chamber, a valve stem extending through an opening in the wall of said housing at the outer end of said valve chamber, a valve return spring coiled coaxially about said valve stem, one end of said spring being fixed to the outer end wall of said valve chamber and the other end of said spring being fixed to the body of said valve, means mounted on the valve stem exterior of said housing for rotating the valve through a predetermined angle to connect the fluid supply conduit with one of said passageways and to connect the exhaust conduit with the other end of said passageways, means for locking the valve in position when it has been rotated to the predetermined position, and means operable independently of the valve rotating means for unlocking the valve, whereby said valve is returned by said spring to its first position.

7. A fluid supply control device, comprising a chamber having a fluid supply and an exhaust conduit opening into one end thereof and fluid distribution passages connected to the opposite sides of said chamber, a valve rotatably mounted in said chamber with its inner end disposed to have face to face engagement with said one end of the chamber, means in said chamber for urging said valve into face to face engagement with said one end of said chamber and for normally urging said valve into a position for effecting registration of said fluid supply conduit with one of said passageways, means associated with said valve for facilitating manual turning thereof into a predetermined position of adjustment in which said fluid supply conduit registers with the opposite one of said passageways, means for latching said manual turning means for holding said valve in said predetermined position of adjustment against the action of said urging means, and means for releasing said latching means to permit the return of said valve to its normal position.

8. A fluid control device, comprising a housing formed with a chamber having a fluid supply and an exhaust conduit opening into one end thereof and fluid distribution passageways connected to the opposite sides of said chamber, a valve rotatably mounted in said chamber with its inner end disposed to have face to face contact with said one end of said chamber and having ports for selectively connecting either of said conduits with either of said passageways, a spring for urging said valve into face to face contact with said one end of said chamber, a conduit formed in the housing for connecting the joint between said contacting faces with that portion of the chamber remote therefrom so as to by-pass fluid from between said contacting faces to the opposite side of said valve, said spring being connected to said housing and said valve for normally turning said valve into a position in which the ports thereof effect registration of said fluid supply conduit with one of said passageways, means for turning said valve into a predetermined position in which the ports thereof effect registration of said fluid supply conduit with the opposite one of said passageways, means for holding said valve in said predetermined position, and means for releasing said holding means to permit return of said valve to its normal position.

9. A fluid flow control device, comprising a chamber having a fluid supply and an exhaust conduit opening into one end thereof and fluid distribution passageways connected to the opposite sides of said chamber, a valve rotatably mounted in said chamber with its inner end disposed to have face to face engagement with the said one end of the chamber and having ports for selectively connecting either of said conduits with either of said passageways, a spring for urging said valve into face to face engagement with said one end of said chamber and for normally urging said valve into a position in which the ports thereof effect registration of said fluid supply conduit with one of said passageways and the exhause conduit with the oppoiste one of said passageways, means for turning said valve into a predetermined position in which the ports thereof effect registration of said exhaust conduit with said one of said passageways and said fluid supply conduit with said opposite one of said passageways, means for releasably holding said valve in said predetermined position against the action of said spring, and means operable upon said holding means for releasing said valve for return to its normal position.

CHARLES E. KERR.

REFERENCES CITED

The following references are of record in the file of this patent:

UNITED STATES PATENTS

| Number | Name | Date |
| --- | --- | --- |
| 342,073 | Curtis | May 18, 1886 |
| 1,049,456 | Coffield | Jan. 7, 1913 |
| 2,044,777 | Erling | June 23, 1936 |
| 2,067,492 | Kingsbury | Jan. 12, 1937 |
| 2,233,521 | Ernst et al. | Mar. 4, 1941 |
| 2,384,221 | Waldie | Sept. 4, 1945 |